United States Patent Office 3,098,053
Patented July 16, 1963

3,098,053
WOOD PATCHING COMPOSITION CONTAINING ACRYLIC ESTER POLYMER AND METHOD OF USE
Earland G. Hallonquist, Nanaimo, British Columbia, Canada, assignor to MacMillan & Bloedel Limited, Vancouver, British Columbia, Canada
No Drawing. Filed Sept. 29, 1959, Ser. No. 843,068
8 Claims. (Cl. 260—31.2)

This invention relates to plastic compositions for filling splits, cracks, crevices and other surface discontinuities in wood and particularly in plywood in conjunction with plywood manufacture.

An appreciable proportion of the veneers used for plywood have imperfections such as knot holes, pitch pockets, worm or borer holes, splits, cracks, and the like, which make these veneers unsuitable for the surface or face plies of plywood unless these defects have been repaired or patched.

Defects such as knot holes and pitch pockets are usually patched in the veneers before gluing, assembly and pressing into plywood by punching or cutting out the defect and plugging it with sound veneer. Machines such as "Raimann" or "Skoog" patchers are used to carry out this operation.

Splits also can be repaired in the veneers before layup and pressing into plywood, by a new method which involves machine closing of the split, and taping it at the edge of the veneer, followed by application of a special heat hardenable plastic filler to any unclosed portion of the split. In the subsequent hot pressing operation for bonding the veneers into plywood, the split is glued closed, and any plastic filler cured and hardened.

Many of the smaller defects, however, are not conveniently repaired until after the veneers have been bonded into plywood. In addition, quite a number of defects, especially splits, originate during handling of the veneer during grading, sorting, lay-up etc. Also some defects are produced during pressing and handling of the plywood. Consequently, considerable patching has to be carried out on the plywood itself. Most of these repairs on the plywood are made by cutting out the defect by means of a special saw or router and inserting inlays of the correct size, coated with glue, which are hammered in by hand or hot pressed into place. These are necessarily tedious operations.

Paste type plastic filler compositions have been considered in the past for patching plywood. The saving in labour would be very appreciable, since the operations involving cutting out the defect, making the wood inlay, gluing the inlay and pressing or hammering in the patch would be eliminated, and the only labour involved would be application of the filler directly to the defect, either by gun application or by hand with putty knife, spatula, or the like. Subsequent sanding would remove any excess of the patching material.

The paste type fillers available up to now have not been very suitable for repairing plywood. Those which harden by chemical action, for example, water putties based on gypsum, ro resin pastes based on thermosetting resin binders, have of necessity either a short working life and hence causes problems in mixing, handling and application, or else require an expensive heat curing treatment of the plywood to cure or harden the patches. The paste type fillers based on thermoplastic resin binders, and which harden by evaporation of their solvent, involve no special handling and application problem, as their working life is unlimited, provided the solvent is not lost. However, these compositions, of which there are many on the market, and which are known as wood putties or plastic woods, have serious disadvantages, especially with respect to plywood patching.

The main deficiencies of these solvent type wood putties are as follows:

(1) In the plywood industry a large proportion of the plywood is bonded with waterproof phenol formaldehyde resin glues which necessitates hot pressing. The hot stacked panels cool relatively slowly, often being still quite hot when they reach the patching lines. The usual plastic wood fillers bubble and blister if used to patch these hot panels. On subsequent sanding the blisters and cavities open up giving a completely unacceptable honeycombed surface. These cavities tend to form under the surface, even on cold panels, although to a less extent than on hot panels.

(2) Drying of the patching composition is so slow, especially on cooler panels, and near the edges of warm panels where it is cooler than in the center, that the patches are soft when sanded, resulting in pulling, smearing and tearing of the patch during the sanding operation, and sagging of the patch below the surface level of the panel when it finally does dry.

(3) Excessive shrinkage occurs on drying, causing the filled area to sag below the surface level of the panel. This shrinkage often is so extensive that the patched areas are not reached and cleaned up in the sanding operations. The result is exceptionally bad when the patches have not dried before the panels are sanded, as noted in (2) above.

(4) Objectionable checking and cracking of the patches occurs during drying. This is particularly noticeable when the repair is of any appreciable size, such as cracks wider than $\frac{1}{16}''$, and the like.

Because of the above difficulties, the plastic wood fillers available up to now have been limited to minor repairs and touch up work in the plywood industry.

I have found that the performance of solvent type plastic filler compositions can be controlled by a selective choice of ingredients and by the relative amounts of these ingredients used. As a result I have developed a plastic filling composition which overcomes the above difficulties and is suitable for rough and finish patching in plywood mills, replacing the usual wooden patches.

The main ingredients of solvent type plastic filler composition are thermoplastic binder resin or resins, filler, and solvent. Throughout this specification and in the accompanying claims the term "resin" is intended to include one or more resins. I have found that one of the most important factors which influence the performance of the patching composition is the particle size and shape of the filler. This, in conjunction with the proportion of resin to filler, controls to a large extent the rate of evaporation of solvent from the composition, the resistance to bubbling on hot panels, and the shrinkage and checking on drying.

Substantially insoluble and inert fillers such as limestone, hydrated gypsum and talc may be used. If the particle size is too small, the specific surface or total filler surface involved is high. A large amount of resin is needed to bind the particles together, and this large amount of resin causes excessive sagging on drying. At the same time, the particles being closely packed, slow up the evaporation of solvent. If more filler is added to prevent sagging, checking begins to take place. If the particle size of the filler is increased, the specific surface is reduced, less resin is required to bind the particles together, and since the ratio of resin to binder is lower than would be necessary with fine particle size filler, there is much less tendency for the composition to sag and check as it dries. The bulking effect of the large particle size filler acts to retain the original shape of the patch. The texture of the composition is more open than is the case with fine particle size filler, the spaces between the particles being greater. As a result the solvent can evaporated more quickly and the composition dries rapidly. The particle size of the filler, however, cannot be too large, or the composition will be too rough and sandy to apply, will not fill fine cracks and checks in the plywood, and will give too coarse a surface on sanding.

I have found that a preferred particle size is that which passes a 200 mesh standard screen and which has a low proportion of very fine particles. Material passing a 325 mesh screen varies from 44 microns down to very fine dust of a micron size or smaller in the case of many commercially available fillers. When such a mixture constitutes the minus 325 mesh fraction it is preferable that this fraction be less than 50% of the total filler. However, if the entire filler has been classified (by air for example) to remove most of the very fine dust around five microns and less in diameter, then a greater portion of minus 325 mesh material can be tolerated. For this reason a description of the filler size in terms of mesh size is not very satisfactory and it is preferable to describe an acceptable filler as having a particle size such that the major portion ranges from 14 to 74 microns in diameter with very little material greater than 149 microns or less than 5 microns.

In the case of available commercial fillers passing a 325 mesh screen, where information on particle size has been available, their effect on the properties of the patching composition was progressively worse the finer the particle size range. The indications were that a particle size diameter range of 14 to 44 microns, for example, would give better results than a 5 to 14 micron diameter range.

The use of a certain proportion of fibrous filler, such as asbestos, has been found to be advantageous for rapid drying, resistance to bubbling on hot panels, resistance to checking, reduction of density of the composition and preventing settling out of the filler in the composition. The fibrous filler, however, cannot have too long an average fiber length or it will detract from the smoothness of the composition and cause balling up and pulling during application. The limit of fibrous characteristics desired in the fibrous filler can be described by its performance in the Quebec Standard Asbestos machine. This machine consists of four boxes; the bottoms of boxes 1, 2 and 3 have screens with progressively finer meshes (½ mesh, 4 mesh and 10 mesh), and the box 4 below is a receptacle for the fines that fall through the other three boxes. The operator determines the grade as follows: he places 16 oz. of material on the top screen, then sets the machine in motion for two minutes. He then weighs the quantities remaining on each screen. I have found that when tested as above, the fibrous filler should be such that no more than 5 ounces are retained on the 10 mesh screen with the remainder going as fines to the box 4 receptacle. The optimum quantity of fibrous filler to non-fibrous filler has been found to be in the range 5 to 15% of the total weight of filler. Lower and higher amounts can be used, but are less effective in producing the desired results.

Resins to be used as binders in plastic patching compositions of the present invention should have good adhesion to wood, good moisture resistance, good strength and impact resistance and sufficiently high softening point. Some of the common commercial resins which have been found suitable are acrylic resins such as polymethyl methacrylate, polyethyl methacrylate, polybutyl methacrylate, and the like, ethyl cellulose, nitrocellulose and styrene-methyl methacrylate copolymer. I have found the acrylic resins especially suitable since they have the property of losing solvent and drying evenly from top to bottom and throughout the mass rather than more rapidly on the surface. Hence, in patching compounds made with acrylic resins there is no hard skin formation on the surface during drying, and consequently less tendency for cavities to form under the surface.

The choice of solvent for the patching composition is dependent on the evaporation rate and solvating power for the thermoplastic binder resin used. Ethyl acetate and toluene are good solvents for the preferred acrylic binder resins of this invention. Ethyl acetate having a high evaporation rate can be used alone if the composition is to be used on cold panels. Toluene, having a higher boiling point, is more desirable for hot panels, while combinations of the two are more adaptable to situations where it is necessary to patch both hot and cold panels. Other solvents such as methyl ethyl ketone, propyl, butyl, isobutyl acetate, acetone, ethanol, methanol, propanol, and the like may also be used depending on the temperature of the plywood to be patched.

Pigments are usually added to the compositions in order to match in so far as possible the colour of the wood being patched. Those used in my formulations to date have been ferrite yellow and burnt sienna with the objective of matching Douglas fir plywood. Other woods might require a different choice of pigments. Dyes possibly could be used instead of pigments.

In some cases, after long standing, there may be a slight separation of the liquids and solids of the mixture, the fillers tending to settle to the lower portion of the container with some resin solution showing at the top. I have found that incorporation in the composition of a small amount of gel formed from an organic ammonium or onium bentonite and solvent promotes suspension and stability of the composition and inhibits a tendency to separate out on standing.

A wood patching composition according to the present invention comprises a solvent-soluble moisture resistant thermoplastic resin having strong adhesion to wood; a solvent for the resin having a boiling point in the range of 50° C. to 150° C. at atmospheric pressure; and a non-fibrous substantially insoluble and inert filler of a particle size such that the major portion ranges from 14 microns to 74 microns in diameter, with substantially none above 149 microns in diameter. An improved composition is obtained if the filler is made up predominantly of said non-fibrous filler, and includes a minor proportion of fibrous filler having a fibre length such that, when a 16 oz. sample is tested on a Quebec Standard Asbestos Testing Machine, not more than 5 oz. are retained on the 10 mesh screen and the remainder goes to the pan as fines.

The amounts of the ingredients of this composition preferably comprise about 3 to 10% by weight of the thermoplastic resin, about 20 to 40% by weight of the solvent, and about 50 to 80% by weight of the specified filler. If the composition includes a fibrous filler along with the non-fibrous filler, it is advantageous to use filler in the proportions of 80 to 97½% by weight of non-fibrous filler to 2½ to 20% by weight of fibrous filler.

Typical formulae, which illustrate the scope of the invention, are as follows:

EXAMPLE 1

| | Percent by weight |
|---|---|
| Polymethyl methacrylate of 950–1600 viscosity (Brookfield) at 25° C. (17.5% solu. in toluene) | 4.7 |
| Ground limestone [1] | 67.5 |
| Ethyl acetate | 13.8 |
| Toluene | 13.8 |
| Ferrite yellow | 0.3 |
| Burnt sienna | 0.03 |

[1] Screen analysis of the ground limestone:

| Microns | Mesh | Percent |
|---|---|---|
| Plus 149 | Plus 100 mesh | Nil |
| Minus 149 to plus 74 | Minus 100 mesh to plus 200 mesh | 7.5 |
| Minus 74 to plus 44 | Minus 200 mesh to plus 325 mesh | 68.8 |
| Minus 44 | Minus 325 mesh | 23.6 |

The above composition gave good results when used to patch hot plywood panels, no bubbling occurring at 140° F. It was fast drying and did not sag or check. Adhesion to the wood was good, and remained good even after two cycles of boiling in water for 4 hours followed by drying at 145° F. for 16 hours.

EXAMPLE 2

| | Percent by weight |
|---|---|
| Polyethyl methacrylate (of 0.849–0.986 inherent viscosity) | 5.7 |
| Ground limestone [1] | 71.0 |
| Ethyl acetate | 17.2 |
| Toluene | 5.7 |
| Ferrite yellow | 0.3 |
| Burnt sienna | 0.07 |

[1] Screen analysis of the ground limestone (putty whiting treated by air classification to remove fine particles):

| Microns | Mesh | Percent |
|---|---|---|
| Plus 149 | Plus 100 mesh | 0.4 |
| Minus 149 to plus 74 | Minus 100 mesh to plus 200 mesh | 6.4 |
| Minus 74 to plus 44 | Minus 200 mesh to plus 325 mesh | 34.2 |
| Minus 44 | Minus 325 mesh | 59.0 |

Of the material passing the 325 mesh screen (minus 44 microns) microscopic examination showed over 75% by weight having a particle diameter of more than 14 microns.

This formulation gave good results in patching hot plywood panels, no bubbling occurring at 140° F. It was fast drying and did not check or sag. Adhesion to the wood was good and remained good after two cycles of boiling in water for 4 hours followed by drying at 145° F. for 16 hours.

EXAMPLE 3

| | Percent by weight |
|---|---|
| Polyethyl methacrylate (of 0.849–0.986 inherent viscosity | 5.8 |
| Hydrated gypsum [1] | 72.5 |
| Ethyl acetate | 16.3 |
| Toluene | 5.4 |

[1] Screen analysis of the hydrated gypsum (after treatment by air classification to remove fine particles):

| Microns | Mesh | Percent |
|---|---|---|
| Plus 149 | Plus 100 mesh | 0.4 |
| Minus 149 to plus 74 | Minus 100 mesh to plus 200 mesh | 23.4 |
| Minus 74 to plus 44 | Minus 200 mesh to plus 325 mesh | 23.0 |
| Minus 44 | Minus 325 mesh | 53.2 |

Of the material passing the 325 mesh screen (minus 44 microns) microscopic examination showed over 75% by weight having a particle diameter of more than 14 microns.

Similar to Example 1. Good results on hot panels at 140° F., fast drying, no checking or sagging. Adhesion to the wood was good and remained good after two cycles of boiling in water for 4 hours followed by drying at 145° F. for 16 hours.

EXAMPLE 4

| | Percent by weight |
|---|---|
| Polyisobutyl methacrylate (viscosity 40–70 seconds, 38% solu. in toluene) | 8.9 |
| Ground limestone [1] | 69.0 |
| Ethyl acetate | 21.3 |
| Ferrite yellow | 0.7 |
| Burnt sienna | 0.13 |

[1] Screen analysis of the ground limestone:

| Microns | Mesh | Percent |
|---|---|---|
| Plus 44 | Plus 325 mesh | 0.5 |
| Minus 44 | Minus 325 mesh | 99.5 |

Mean particle size 14 microns.

This formulation was smoother than Examples 1, 2 and 3 but was not as resistant to bubbling on hot panels, and had a slight tendency to sag on drying. It was considered satisfactory but at the lower limit of acceptance relative to particle size of the filler. However, it was considerably superior to commercial plastic wood products (Examples 17 and 18).

EXAMPLE 5

| | Percent by weight |
|---|---|
| Polyethyl methacrylate (of 0.849–0.986 inherent viscosity) | 5.2 |
| Finely ground limestone [1] | 64.0 |
| Ethyl acetate | 23.1 |
| Toluene | 7.7 |

[1] Reported by manufacturer to have a particle size range of 0.5 to 10 microns, with an average particle size of 2.5 microns.

This is an example of the use of a fine particle size filler with approximately the same proportion of resin as in earlier examples. Due to the fine particle size of the filler, the resin was insufficient for proper binding and adhesion. While resistance to bubbling was obtained, drying time was short, and excessive sagging was overcome, the adhesion was poor, the patches checked badly on drying, and were soft and crumbly. No resistance to boil test.

EXAMPLE 6

| | Percent by weight |
|---|---|
| Polyethyl methacrylate (of 0.849–0.986 inherent viscosity) | 15.7 |
| Finely ground limestone [1] | 56.0 |
| Ethyl acetate | 21.0 |
| Toluene | 7.3 |

[1] Reported by manufacturer to have a particle size range of 0.5 to 10 microns, with an average particle size of 2.5 microns.

This is an example of the use of a fine particle size filler with sufficient resin to provide adequate binding and adhesion. In this case a hard patch was obtained, which did not check, and was resistant to boiling. However, the composition bubbled badly on hot panels (140° F.), was very slow drying, and sagged on drying.

Examples 5 and 6 demonstrate that a fine particle size filler does not give satisfactory results, either with high or low amounts of resin.

EXAMPLE 7

| | Percent by weight |
|---|---|
| Polyethyl methacrylate (of 0.849–0.986 inherent viscosity) | 5.5 |
| Ground limestone [1] | 65.0 |
| Asbestos floats [2] | 3.35 |
| Ethyl acetate | 19.4 |
| Toluene | 6.5 |
| Ferrite yellow | 0.2 |
| Burnt sienna | 0.05 |

[1] Screen analysis of ground limestone (air classified to remove fine particles):

| Microns | Mesh | Percent |
|---|---|---|
| Plus 149 | Plus 100 mesh | 0.4 |
| Minus 149 to plus 74 | Minus 100 mesh to plus 200 mesh | 6.4 |
| Minus 74 to plus 44 | Minus 200 mesh to plus 325 mesh | 34.2 |
| Minus 44 | Minus 325 mesh | 59.0 |

Of the material passing the 325 mesh screen (minus 44 microns) microscopic examination showed over 75% by weight having a particle diameter of more than 14 microns.

[2] Asbestos floats giving less than 5 ounces on 10 mesh screen and remainder of 16 ounce sample as fines in the pan when tested on Quebec Standard Asbestos Machine.

An example of a composition using a combination of non-fibrous and fibrous filler, as described above. This formulation was resistant to bubbling at 140° F.

on hot panels, was fast drying and exhibited no sagging or checking. Adhesion to the wood was good and remained good after two cycles of boiling in water for 4 hours followed by drying at 145° F. for 16 hours. The composition was very smooth to apply, and tended to be somewhat thixotropic which prevented settling out of the pigment on standing.

EXAMPLE 8

Percent by weight

| | |
|---|---|
| Polyethyl methacrylate (of 0.842–0.986 inherent viscosity) | 5.5 |
| Ground limestone [1] | 66.0 |
| Asbestos floats [2] | 3.5 |
| Ethyl acetate | 18.7 |
| Toluene | 6.3 |

[1] Screen analysis of ground limestone (air classified to remove fine particles, and plus 200 mesh particles added):

| Microns | Mesh | Percent |
|---|---|---|
| Plus 149 | Plus 100 mesh | 4.5 |
| Minus 149 to plus 74 | Minus 100 mesh to plus 200 mesh | 11.55 |
| Minus 74 to plus 44 | Minus 200 mesh to plus 325 mesh | 30.80 |
| Minus 44 | Minus 325 mesh | 53.15 |

Of the material passing the 325 mesh screen (minus 44 microns) microscopic examination showed over 75% by weight having a particle diameter of more than 14 microns.

[2] Asbestos floats giving less than 5 ounces on 10 mesh screen and remainder of 16 ounce sample as fines in the pan when tested on Quebec Standard Asbestos Machine.

This formulation performed similar to Example 7 except that it was not as smooth and a little more gritty, due to the increase in plus 100 mesh particles. However, it was still considered acceptable in performance.

EXAMPLE 9

Percent by weight

| | |
|---|---|
| Polyethyl methacrylate (of 0.849–0.986 inherent viscosity | 5.5 |
| Ground limestone [1] | 66.0 |
| Asbestos floats [2] | 3.5 |
| Ethyl acetate | 18.7 |
| Toluene | 6.3 |

[1] Screen analysis of ground limestone (air classified to remove fine particles, and plus 200 mesh particles added):

| Microns | Mesh | Percent |
|---|---|---|
| Plus 149 | Plus 100 mesh | 7.9 |
| Minus 149 to plus 74 | Minus 100 mesh to plus 200 mesh | 15.85 |
| Minus 74 to plus 44 | Minus 200 mesh to plus 325 mesh | 27.95 |
| Minus 44 | Minus 325 mesh | 48.30 |

Of the material passing the 325 mesh screen (minus 44 microns microscopic examination showed over 75% by weight having a particle diameter of more than 14 microns.

[2] Asbestos floats giving less than 5 ounces on 10 mesh screen and the remainder going to the pan as fines when tested on the Quebec Standard Asbestos Machine.

This formulation, while performing satisfactorily in other respects, was so gritty due to the presence of the plus 100 mesh particles in the filler that it was considered unacceptable.

EXAMPLE 10

Percent by weight

| | |
|---|---|
| Polyethyl methacrylate (of 0.849–0.986 inherent viscosity) | 5.6 |
| Talc [1] | 66.0 |
| Asbestos floats [2] | 3.5 |
| Ethyl acetate | 18.65 |
| Toluene | 6.25 |

[1] Reported by manufacturer that 69% of this material had a particle size diameter of 14 to 44 microns, with only 1% over 44 microns in diameter.

[2] Asbestos floats giving less than 5 ounces on the 10 mesh screen and the remainder going to the pan as fines when tested on the Quebec Standard Asbestos Machine.

This is an example where talc was used as the non-fibrous filler. Performance was similar to Example 7.

EXAMPLE 11

Percent by weight

| | |
|---|---|
| Polyethyl methacrylate (of 0.849–0.986 inherent viscosity) | 6.8 |
| Ground limestone [1] | 64.0 |
| Asbestos floats [2] | 3.4 |
| Ethyl acetate | 12.9 |
| Toluene | 12.9 |

[1] Screen analysis of ground limestone (air classified to remove fine particles):

| Microns | Mesh | Percent |
|---|---|---|
| Plus 149 | Plus 100 mesh | 0.4 |
| Minus 149 to plus 74 | Minus 100 mesh to plus 200 mesh | 6.4 |
| Minus 74 to plus 44 | Minus 200 mesh to plus 325 mesh | 34.2 |
| Minus 44 | Minus 325 mesh | 59.0 |

Of the material passing the 325 mesh screen (minus 44 microns) microscopic examination showed over 75% by weight having a particle diameter of more than 14 microns.

[2] Asbestos floats giving less than 5 ounces on 10 mesh screen and the remainder going to the pan as fines when tested on the Quebec Standard Asbestos Machine.

The above formulation gave satisfactory results in all respects. Due to slightly higher resin content and higher boiling solvent than Example 7, the drying time on cold panels was slightly longer. However, for the same reasons this composition gave a somewhat smoother and harder patch on hot panels.

EXAMPLE 12

Percent by weight

| | |
|---|---|
| Ethyl cellulose (ethoxy content 48.0–49.5: viscosity of 5% solu. 10 cps.) | 7.0 |
| Ground limestone [1] | 66.0 |
| Asbestos floats [2] | 3.5 |
| Toluene | 23.5 |

[1] Screen analysis of ground limestone:

| Microns | Mesh | Percent |
|---|---|---|
| Plus 149 | Plus 100 mesh | 0.15 |
| Minus 149 to plus 74 | Minus 100 mesh to plus 200 mesh | 7.25 |
| Minus 74 to plus 44 | Minus 200 mesh to plus 325 mesh | 26.1 |
| Minus 44 | Minus 325 mesh | 66.5 |

Of the material passing the 325 mesh screen (minus 44 microns) microscopic examination showed over 60% by weight having a particle diameter of more than 14 microns.

[2] Asbestos floats giving less than 5 ounces on 10 mesh screen and the remainder going to the pan as fines when tested on the Quebec Standard Asbestos Machine.

An example of our patching composition using a different resin, ethyl cellulose, with the combined non-fibrous and fibrous filler. This composition was resistant to bubbling on hot panels at 140° F., was very fast drying, did not sag or check, and exhibited good adhesion to the wood, both before and after 2 cycles of boiling in water for 4 hours followed by drying at 145° F. for 16 hours.

EXAMPLE 13

Percent by weight

| | |
|---|---|
| Styrene-methyl methacrylate copolymer | 5.5 |
| Ground limestone [1] | 65.0 |
| Asbestos floats [2] | 3.5 |
| Ethyl acetate | 19.5 |
| Toluene | 6.5 |

[1] Screen analysis of ground limestone (air classified to remove fine particles):

| Microns | Mesh | Percent |
|---|---|---|
| Plus 149 | Plus 100 mesh | 0.2 |
| Minus 149 to plus 74 | Minus 100 mesh to plus 200 mesh | 11.8 |
| Minus 74 to plus 44 | Minus 200 mesh to plus 325 mesh | 29.0 |
| Minus 44 | Minus 325 mesh | 59.0 |

Of the material passing the 325 mesh screen (minus 44 microns) microscopic examination showed over 60% by weight having a particle diameter of more than 14 microns.

[2] Asbestos floats giving less than 5 ounces on 10 mesh screen and the remainder going to the pan as fines when tested on the Quebec Standard Asbestos Machine.

An example using styrene-methyl methacrylate resin as the binder. This composition performed similar to Example 7.

EXAMPLE 14

| | Percent by weight |
|---|---|
| Nitrocellulose (½ sec. viscosity) | 5.6 |
| Ethanol (in the nitrocellulose) | 2.4 |
| Ground limestone [1] | 66.3 |
| Asbestos [2] | 3.5 |
| Butyl acetate | 11.1 |
| Ethyl acetate | 11.1 |

[1] Screen analysis of ground limestone (air classified to remove fine particles):

| Microns | Mesh | Percent |
|---|---|---|
| Plus 149 microns | Plus 100 mesh | 0.2 |
| Minus 149 to plus 74 | Minus 100 mesh to plus 200 mesh | 11.8 |
| Minus 74 to plus 44 | Minus 200 mesh to plus 325 mesh | 29.0 |
| Minus 44 | Minus 325 mesh | 59.0 |

Of the material passing the 325 mesh screen (minus 44 microns) microscopic examination showed over 75% by weight having a particle diameter of more than 14 microns.

[2] Asbestos floats giving less than 5 ounces on 10 mesh screen and the remainder going to the pan as fines when tested on Quebec Standard Asbestos Machine.

An example using nitrocellulose as the binder. This composition performed satisfactorily with the exception of a slight tendency to form cavities under the surface, especially on hot panels.

EXAMPLE 15

| | Percent by weight |
|---|---|
| Polyethyl methacrylate (of 0.839–0.986 inherent viscosity | 5.42 |
| Ground limestone [1] | 64.50 |
| Asbestos floats [2] | 3.40 |
| Ethyl acetate | 18.0 |
| Toluene | 6.0 |
| Ferrite yellow | 0.22 |
| Burnt sienna | 0.06 |
| Dimethyldioctadecyl ammonium bentonite gel in toluene and methanol [3] | 2.40 |

[1] Screen analysis of ground limestone:

| Microns | Mesh | Percent |
|---|---|---|
| Plus 149 | Plus 100 mesh | 0.15 |
| Minus 149 to plus 74 | Minus 100 mesh to plus 200 mesh | 14.85 |
| Minus 74 to plus 44 | Minus 200 mesh to plus 325 mesh | 24.7 |
| Minus 44 | Minus 325 mesh | 59.2 |

Of the material passing the 325 mesh screen (minus 44 microns) microscopic examination showed over 60% by weight having a particle diameter of more than 14 microns.

[2] Asbestos floats giving less than 5 ounces on 10 mesh screen and remainder of 16 ounce sample as fines in the pan when tested on Quebec Standard Asbestos Machine.
[3] This gel was prepared by agitating 10 parts by weight of dimethyldioctadecyl ammonium bentonite in 88.5 parts of toluene and 1.5 parts of methanol, for 10 minutes at 1,800 r.p.m. in a Cowles dissolver.

A composition similar to Example 7, except that it contains an organic ammonium bentonite gel to improve the stability of the composition and inhibit separation of resin solution from the fillers. Its performance in patching plywood panels, hot or cold, was similar to that of Example 7.

EXAMPLE 16

| | Percent by weight |
|---|---|
| Polyethyl methacrylate (of 0.849–0.986 inherent viscosity) | 7.88 |
| Ground limestone [1] | 62.05 |
| Asbestos floats [2] | 3.28 |
| Ethyl acetate | 18.40 |
| Toluene | 6.15 |
| Ferrite yellow | 0.21 |
| Burnt sienna | 0.06 |
| Dimethyldioctadecyl ammonium bentonite gel in toluene and methanol [3] | 1.97 |

[1] Screen analysis of ground limestone:

| Microns | Mesh | Percent |
|---|---|---|
| Plus 149 | Plus 100 mesh | 0.1 |
| Minus 149 to plus 74 | Minus 100 mesh to plus 200 mesh | 5.5 |
| Minus 74 to plus 44 | Minus 200 mesh to plus 325 mesh | 29.0 |
| Minus 44 | Minus 325 mesh | 65.4 |

Of the material passing the 325 mesh screen (minus 44 microns) microscopic examination showed over 60% by weight having a particle diameter of more than 14 microns.

[2] Asbestos floats giving less than 5 ounces on 10 mesh screen and remainder of 16 ounce sample as fines in the pan when tested on Quebec Standard Asbestos Machine.
[3] This gel was prepared by agitating 10 parts by weight of dimethyl dioctadecyl ammonium bentonite in 88.5 parts of toluene and 1.5 parts of methanol for 10 minutes at 1800 r.p.m. in a Cowles dissolver.

EXAMPLE 17

*Commercial Plastic Wood Filler (A)*

Bubbled on hot panels at 140° F., sagged, checked and formed cavities under the surface on drying. Poor adhesion to wood after 2 cycles of boiling in water for 4 hours followed by drying at 145° F. for 16 hours. Unsatisfactory for plywood patching.

EXAMPLE 18

*Commercial Plastic Wood Filler (B)*

Bubbled on hot panels, sagged, checked and formed cavities under the surface on drying. Good adhesion to the wood, both before and after 2 cycles of boiling in water for 4 hours followed by drying at 145° F. for 16 hours. Unsatisfactory for plywood patching.

What I claim as my invention is:
1. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a substantially insoluble, inert, non-fibrous, filler of a particle size such that the major portion ranges from 14 microns to 74 microns in diameter, with substantially none above 49 microns in diameter.
2. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a substantially insoluble, inert, filler comprising 80 to 97% by weight of a non-fibrous filler of a particle size such that the major portion ranges from 14 microns to 74 microns in diameter, with substantially none above 149 microns in diameter, and 2½ to 20% by weight of a fibrous filler having a fiber length such that, when a 16 ounce sample is tested on a Quebec Standard Asbestos Testing Machine, not more than 5 ounces are retained on the 10 mesh screen and the remainder goes to the pan as fines.

3. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; a minor amount of a gel selected from the group consisting of organic ammonium and onium bentonite mixed with a solvent therefor; about 20 to 40% by weight of an organic solvent for the resin having a boiling point in the range of 50° C. to 150° C. at atmospheric pressure; and about 50 to 80% by weight of a substantially insoluble, inert, non-fibrous, filler of a particle size such that the major portion ranges from 14 microns to 74 microns in diameter, with substantially none above 149 microns in diameter.

4. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a substantially insoluble, inert, non-fibrous, filler selected from the group consisting of limestone, hydrated gypsum and talc, said filler being of a particle size such that the major portion ranges from 14 microns to 74 microns in diameter, with substantially none above 149 microns in diameter.

5. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a filler comprising 80 to 97½% by weight of a non-fibrous substantially insoluble, inert, filler selected from the group consisting of limestone, hydrated gypsum and talc, said non-fibrous filler being of a particle size such that the major portion ranges from 14 microns to 74 microns in diameter, with substantially none above 149 microns in diameter, and 2½ to 20% by weight of a fibrous filler having a fiber length such that, when a 16 ounce sample is tested on a Quebec Standard Asbestos Testing Machine, not more than 5 ounces are retained on the 10 mesh screen and the remainder goes to the pan as fines.

6. A wood patching composition consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure and selected from the group consisting of ethyl acetate, toluene, methyl ethyl ketone, propyl, butyl and isobutyl acetate, acetone, ethanol, methanol and propanol, and about 50 to 80% by weight of a substantially insoluble, inert, non-fibrous, filler selected from the group consisting of limestone, hydrated gypsum and talc, said filler being of a particle size such that the major portion ranges from 14 microns to 74 microns in diameter, with substantially none above 149 microns in diameter.

7. The process of patching defects in wood or plywood which comprises filling such defects with a paste consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a substantially insoluble, inert, non-fibrous, filler of a particle size such that the major portion ranges from 14 microns to 74 microns in diameter, with substantially none above 149 mircrons in diameter.

8. The process of patching defects in wood or plywood which comprises filling such defects with a paste consisting essentially of about 3 to 10% by weight of a thermoplastic resin selected from the group consisting of polymethyl methacrylate, polyethyl methacrylate, polyisobutyl methacrylate, and styrene-methyl methacrylate copolymer; about 20 to 40% by weight of an organic solvent for the resin having a boiling point in the range of 50° C. to 150° C. at atmospheric pressure; and about 50 to 80% by weight of a substantially insoluble, inert, filler comprising 80 to 97½% by weight of a non-fibrous filler of a particle size such that the major portion ranges from 14 microns to 74 microns in diameter, with substantially none above 149 microns in diameter, and 2½ to 20% by weight of a fibrous filler having a fiber length such that, when a 16 ounce sample is tested on a Quebec Standard Asbestos Testing Machine, not more than 5 ounces are retained on the 10 mesh screen and the remainder goes to the pan as fines.

References Cited in the file of this patent

UNITED STATES PATENTS

| | | |
|---|---|---|
| 2,433,910 | Johnson | Jan. 6, 1948 |
| 2,630,395 | McCullough et al. | Mar. 3, 1953 |
| 2,770,556 | Grangaard et al. | Nov. 13, 1956 |
| 2,888,359 | Jorgensen et al. | May 26, 1959 |
| 2,964,486 | Bernier | Dec. 13, 1960 |
| 2,979,416 | Drexler | Apr. 11, 1961 |
| 3,011,903 | Clock et al. | Dec. 5, 1961 |